US008499449B2

(12) United States Patent
Tardif et al.

(10) Patent No.: US 8,499,449 B2

(45) Date of Patent: Aug. 6, 2013

(54) METHOD FOR MANUFACTURING A TURBINE BLADE

(75) Inventors: Marc Tardif, Candiac (CA); Harris Shafique, Longueuil (CA); Mario Guerra, Montreal (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 0 days.

(21) Appl. No.: 13/438,195

(22) Filed: Apr. 3, 2012

(65) Prior Publication Data

US 2012/0186082 A1 Jul. 26, 2012

Related U.S. Application Data

(62) Division of application No. 12/172,515, filed on Jul. 14, 2008, now Pat. No. 8,167,572.

(51) Int. Cl.

| | |
|---|---|
| ***B21D 53/78*** | (2006.01) |
| ***B21K 3/04*** | (2006.01) |
| ***B23P 15/02*** | (2006.01) |

(52) U.S. Cl.
USPC .................................... 29/889.7; 29/889.21

(58) Field of Classification Search
USPC ............ 29/889.21, 889.7; 415/173.1, 173.3, 415/173.4; 416/97 R, 228
See application file for complete search history.

(56) References Cited

U.S. PATENT DOCUMENTS

| | | | |
|---|---|---|---|
| 3,290,004 A | 12/1966 | Ishibashi | |
| 3,802,046 A | 4/1974 | Wachtell et al. | |
| 4,274,806 A | 6/1981 | Gallardo, Jr. | |
| 4,974,633 A | 12/1990 | Hickey | |
| 6,164,914 A | 12/2000 | Correia et al. | |
| 6,183,197 B1 | 2/2001 | Bunker et al. | |
| 6,328,532 B1 | 12/2001 | Hahnle | |
| 6,478,537 B2 | 11/2002 | Junkin | |
| 6,607,359 B2 | 8/2003 | von Flotow | |
| 6,790,005 B2 | 9/2004 | Lee et al. | |
| 6,976,826 B2 | 12/2005 | Roy et al. | |
| 6,991,430 B2 | 1/2006 | Stec et al. | |
| 7,175,391 B2 | 2/2007 | Chlus et al. | |
| 7,281,894 B2 | 10/2007 | Lee et al. | |
| 7,290,986 B2 | 11/2007 | Stegemiller et al. | |
| 7,645,123 B1 | 1/2010 | Liang | |
| 7,686,578 B2 | 3/2010 | Klasing et al. | |
| 7,922,451 B1 | 4/2011 | Liang | |
| 2001/0033793 A1 | 10/2001 | Lewis et al. | |
| 2003/0118444 A1* | 6/2003 | Lee et al. | 416/97 R |
| 2004/0126236 A1 | 7/2004 | Lee et al. | |
| 2007/0258815 A1 | 11/2007 | Liang | |
| 2008/0118367 A1 | 5/2008 | Liang et al. | |

FOREIGN PATENT DOCUMENTS

| | | |
|---|---|---|
| EP | 1057972 | 12/2000 |
| EP | 1079072 | 2/2001 |
| EP | 1422383 | 5/2004 |
| EP | 0916811 | 2/2005 |
| EP | 1930547 | 6/2008 |
| GB | 2324835 | 11/1998 |

* cited by examiner

*Primary Examiner* — Michelle Mandala
(74) *Attorney, Agent, or Firm* — Norton Rose Fulbright Canada LLP

(57) ABSTRACT

A turbine blade growth pocket provides a feature to measure blade growth due to engine operation while maintaining dynamic characteristics of the turbine blade within acceptable limits by providing a variable radius fillet between the pocket and a side rail of the pocket.

8 Claims, 3 Drawing Sheets

METHOD FOR MANUFACTURING A TURBINE BLADE

RELATED APPLICATIONS

This application is a divisional of U.S. patent application Ser. No. 12/172,515 filed on Jul. 14, 2008 now U.S. Pat. No. 8,167,572.

TECHNICAL FIELD

This application relates to gas turbine engines and, in particular, to the design of rotary airfoil blades therefor.

BACKGROUND

The design of gas turbine blades is an area of continuous improvement as blade geometry and material directly impact engine performance. Blade creep growth is a perennial issue with high pressure turbine blades (i.e. blades mounted on the high pressure turbine, or compressor turbine) due to the hot environment in which they operate. A feature, sometimes known as a "growth pocket", may be incorporated at or near the tip of a high pressure turbine blade to assist with monitoring blade creep growth over the life of the part and establish at which point the blade needs replacement. However, introducing a growth pocket can introduce stress concentrations, structural or dynamic weakness, and/or vibration issues, depending on the blade design and the specific environment to which the blade is subjected in use. Accordingly, there is room for improvement.

SUMMARY

In a first aspect, provided is a turbine blade comprising an airfoil extending from a root to a tip, the airfoil defined by a suction side and a pressure side each extending from a leading edge to a trailing edge, the tip having a suction side rail of constant thickness defining a suction side outer periphery of the tip, the tip further having a substantially constant depth pocket defined in the tip, the pocket extending from the suction side rail chordwise to a rail-less pressure side, the pocket having a planar floor extending from the suction side rail to the pressure side and meeting the pressure side substantially perpendicularly along an entire length of the pocket, the length of the pocket extending substantially from the blade leading edge to the blade trailing edge, the pocket further comprising a fillet radius between the planar floor and the suction side rail along an entire length of the suction side rail, the fillet radius having at least a first radius in a region of the pocket corresponding to a maximum width of the pocket and a second radius in a region of the pocket adjacent the blade trailing edge, wherein the second radius is larger than the first radius.

In a second aspect, provided is a turbine blade comprising an airfoil extending from a root to a tip, the airfoil defined by a suction side and a pressure side each extending from a leading edge to a trailing edge, the tip being a substantially planar surface extending perpendicularly from the pressure side, the tip having a suction side rail extending radially outwardly from the planar surface along the suction side of the airfoil, the suction side rail having substantially constant thickness, the rail and surface being substantially perpendicular to one another and having a fillet radius extending between the rail and surface along an entire length of a rail-surface interface, the fillet radius having a changing radius along its length, wherein the fillet radius has a smaller radius adjacent the blade leading edge and a larger radius adjacent the blade trailing edge.

In a third aspect, provided is a method of making a turbine blade comprising a method of manufacturing a turbine blade, the method comprising the steps of: casting a turbine blade having at least an airfoil having a leading edge a trailing edge, pressure and suctions sides and a tip; electron discharge machining (EDM) a tip using an electrode to provide an airfoil-shaped tip pocket, the tip pocket having a floor extending substantially perpendicularly relative to the pressure side, the pocket being defined on at least one side by a rail extending above the pocket.

DRAWINGS

The figures depict aspects of the disclosed apparatus and method, in which.

Figure 1:
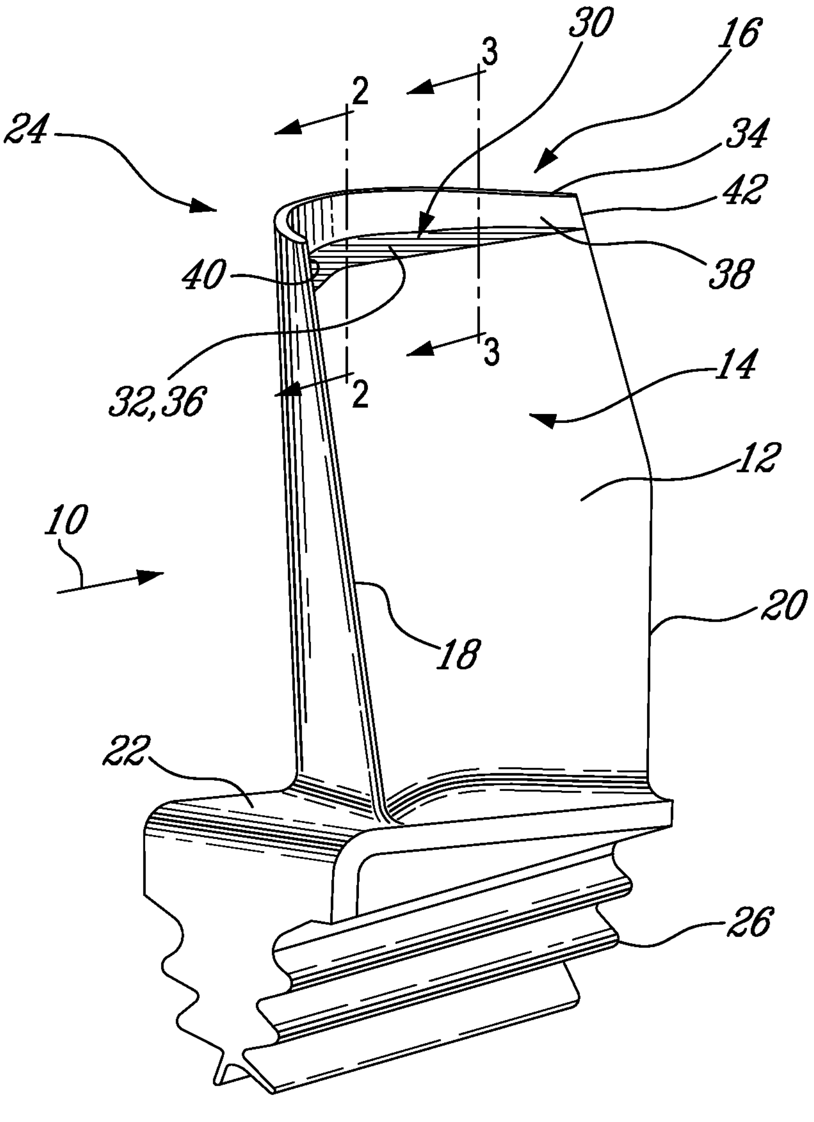
FIG. 1 shows an isometric version of a turbine blade according to the present description.
Figure 5:
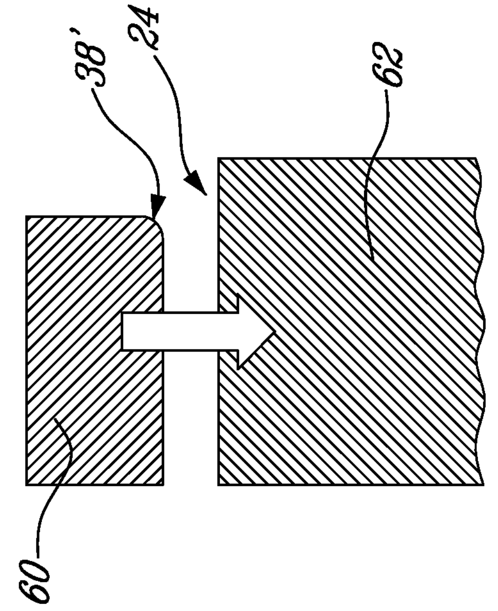

FIG. 5 schematically shows how a tip portion of the blade of FIG. 1 may be made.

DESCRIPTION

FIG. 1 depicts a turbine blade 10 having an internally uncooled airfoil body 12 (i.e. the body is solid, free from internal cooling cavities, orifices, etc.), defined by a pressure side 14 and a suction side 16 each extending from a blade leading edge 18 to a blade trailing edge 20. The airfoil body extends radially outwardly (relative to an engine axis, not shown, when the blade is installed in the engine) from a root platform 22 to an unsupported or free end terminating in tip 24. The tip 24 is shroud-less, meaning that there is no shroud mounted to the tip, and as such the outer periphery of the tip is substantially the same shape as the outer periphery of the airfoil body 12 (i.e. airfoil shaped). A "fir tree" blade fixing 26 extends radially inwardly from an underside of the root platform and provides a means for fixing the blade to an engine rotor disc (not shown).

A growth pocket 30 is provided in the blade tip 24, the pocket having a tip platform 32 bounded on the suction side 16 of the blade by a suction-side rail 34. The tip platform 32 has a planar portion 36 which extends axially (i.e. substantially perpendicular to a radius extending from the engine axis) across the blade. The tip platform extends chord-wise across the blade from the suction-side rail to a rail-less pressure side 14 of the blade, the absence of a rail on the pressure side resulting in a generally perpendicular intersection of the tip platform 32 and the blade pressure side 14. A tip platform of this configuration is provided to minimize tip weight, to reduce centrifugally-induced steady stresses and for vibration interference tuning. Though not depicted in the Figures, a slight radius or break-edge may be provided between platform 32 and pressure side 14. The tip platform is a flat, featureless surface, uninterrupted by cooling holes.

The growth pocket 30 further includes a fillet radius 38 between tip platform 32 and suction-side rail 34, extending generally from a leading edge end 40 to a trailing edge end 42 of the fillet radius 38 along the entire length of the platform-rail interface. However, the size of the fillet radius 38 is not constant along its length, as it extends from end 40 to end 42, as will now be described.

Figure 3:
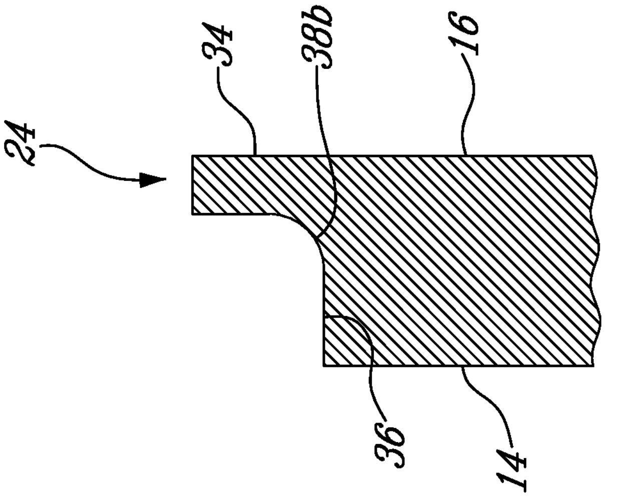
FIG. 3 shows an enlarged portion of the cross-section taken along line 3-3 in FIG. 1.
Figure 2:
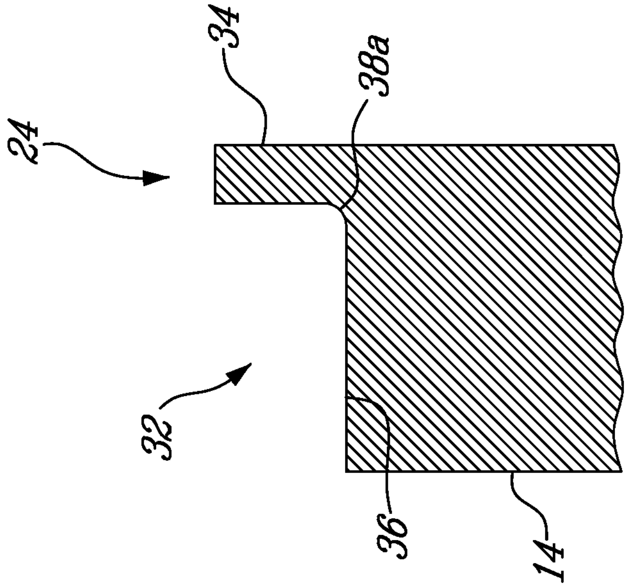
FIG. 2 shows an enlarged portion of the cross-section taken along line 2-2 in FIG. 1.
Figure 4:
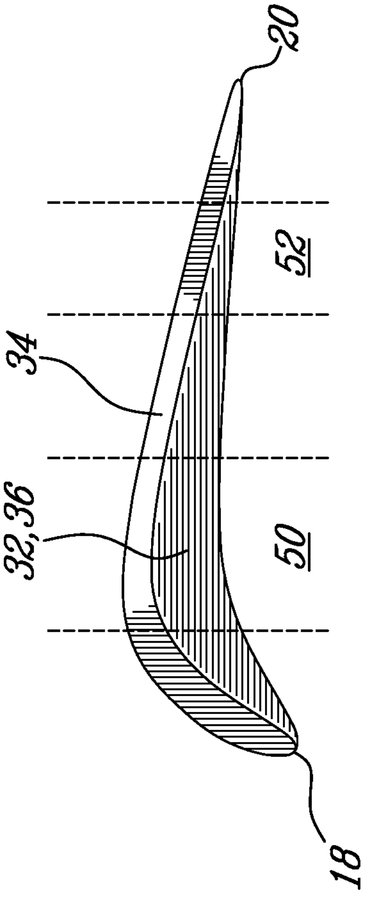
FIG. 4 shows a plan view of the blade tip of FIG. 1.

As shown in FIG. 2, fillet radius 38 has a smaller radius 38*a* near the leading edge end 40 to provide sufficient room on tip platform 32 for a blade growth measurement probe to adequately measure blade growth (e.g. due to creep) in a zone 50 of the pocket (see FIG. 4). Since measurement is best taken from a flat (planar) surface perpendicular to the engine radius, it is desirable to provide a measurement surface (surface 36) free from the effects of a fillet radius, and thus a small radius achieves the largest possible measurement surface. However, as shown in FIG. 3, fillet radius 38 has a larger radius 38*b* near the trailing edge end 42 to better distribute vibratory stresses in the thin region of the airfoil body 12, indicated as zone 52 in the Figures. The radius of fillet radius 38 may transition smoothly between radiuses 38*a* and 38*b*, and may consistently increase from a region where radius 38*a* is present to a region where 38*b* is present. The radius may increase at a constant rate between radius 38*a* and 38*b*, or may increase in increments, or in any suitable manner.

The growth pocket 30 is radially positioned on the blade to have a specific desired radial depth from the blade tip (i.e. from the height of the suction-side rail), which may be 0.105", for example. The pocket depth may be selected to optimize negative effects due to airfoil torsional vibration mode (if the pocket was too deep) and negative effects due to airfoil bending vibration mode (if the pocket is too shallow).

The growth pocket axial position is specifically set to leave a sufficient wall thickness at the airfoil tip (i.e. the thickness of suction-side rail 34), which may be a minimum of 0.017", such that the blade can withstand a blade tip rub without excessive damage to the blade. The suction-side rail may be constant thickness along its length from leading edge to trailing edge. With a rail of constant thickness, the planar portion 36 of the tip platform 32 itself has an airfoil shape (i.e. the airfoil 12 cross-sectional shape less the cross-sectional shape of the rail and fillet radius).

The blade may be cast from a single crystal alloy. The pocket, however, cannot easily be provided in a casting, and it is difficult to conventionally machine reliably, due to the variable fillet radius and thin wall thickness for suction-side rail 34. Therefore, referring to FIG. 5, once the blade is cast, the growth pocket may be provided using a Electron Discharge Machining (EDM) process with a formed electrode 60, the formed electrode having a shape suitable to provide the desired pocket shape described above, including a radius portion 38' to provide radius 38, is used to form the pocket 30 in an end of the as-cast blade 62. Once formed, the pocket may be bordered on at least one side by the rail 34. Subsequent to EDM machining of growth pocket, the growth pocket can be finished by honing or polishing to improve surface finish and have remove/negate any debit in material properties.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A method of manufacturing a turbine blade, the method comprising:

casting a turbine blade having at least an airfoil having a leading edge, a trailing edge, pressure and suctions sides and a tip;

electron discharge machining (EDM) the tip using an electrode to provide an airfoil-shaped tip pocket, the tip pocket having a floor extending substantially perpendicularly relative to the pressure and suction sides, the tip pocket including a rail extending from the floor along the suction side of the airfoil only.

2. The method of claim 1 wherein the tip pocket has a fillet radius between the floor and the rail, the fillet radius having a radius varying along a length of the tip pocket between the leading edge and the trailing edge.

3. The method of claim 2 wherein a single EDM electrode provides the pocket and the variable radius fillet radius.

4. The method of claim 3 wherein the fillet radius varies from a minimum radius at a location corresponding to a maximum pocket width to a maximum radius adjacent the blade trailing edge.

5. The method of claim 1, wherein the rail has a constant thickness.

6. The method of claim 2, wherein the fillet radius has a first radius in a region of the tip pocket corresponding to a maximum width of the tip pocket and a second radius in a region of the pocket adjacent the blade trailing edge.

7. The method of claim 6, wherein the second radius is larger than the first radius.

8. The method of claim 7, wherein the fillet radius gradually increases along a fillet radius length between the first radius and the second radius.

* * * * *